Nov. 2, 1965    W. A. COLEAL    3,214,906

HYBRID ROCKET MOTOR

Filed July 5, 1962    3 Sheets-Sheet 1

INVENTOR.
WILLIAM A. COLEAL

BY

*Robert C. Brown*

ATTORNEY

Nov. 2, 1965

W. A. COLEAL 3,214,906

HYBRID ROCKET MOTOR

Filed July 5, 1962

INVENTOR.
WILLIAM A. COLEAL

BY

ATTORNEY

Nov. 2, 1965  W. A. COLEAL  3,214,906
HYBRID ROCKET MOTOR
Filed July 5, 1962  3 Sheets-Sheet 3

INVENTOR.
WILLIAM A. COLEAL
BY
ATTORNEY

United States Patent Office 3,214,906
Patented Nov. 2, 1965

3,214,906
HYBRID ROCKET MOTOR
William A. Coleal, Shingle Springs, Calif., assignor to Aerojet-General Corporation, Azusa, Calif., a corporation of Ohio
Filed July 5, 1962, Ser. No. 207,532
7 Claims. (Cl. 60—35.6)

The present invention relates to a rocket motor of the hybrid type which is one designed to combine advantages of the solid fuel and liquid fuel types.

The solid fuel rocket engine has the merit of simplicity, but once firing has started, combustion cannot be stopped. A liquid fuel rocket engine has the advantage of much greater flexibility as to controlling the ignition thereof for starting and stopping combustion, but at the expense of greater complexity and attendant danger of malfunction.

It is an object of the present invention to provide a hybrid rocket motor having a minimum over-all length without sacrifice of power, thus making it particularly adaptable to the upper and terminal stages of a multiple stage rocket.

A further object of the invention is to provide a hybrid rocket motor having a plug nozzle, which is one utilizing external expansion of the rocket exhaust gases and enables much more efficient operation to be obtained over a wide range of altitudes than does the usual form of internal expansion nozzle.

Another object of the invention is to provide a rocket which eliminates the high nozzle ejection loads characteristic of present plug nozzle designs, thereby rendering the rocket equally adaptable as a booster for launch vehicles.

A still further object of the invention is to provide for regenerative cooling of the plug nozzle by the liquid oxidizer.

Another object of the invention is to provide a hybrid rocket motor having means for obtaining thrust vector control by controlling the admission of liquid oxidizer to combustion chamber elements of the motor.

Yet another object of the invention is to provide a hybrid rocket motor having a re-usable tank for liquid oxidizer detachably connected to the combustion chamber portion of the rocket.

A further object of the invention is to provide a hybrid rocket motor having a gas generator which operates a pump supplying liquid oxidizer to the combustion chamber elements of the motor and which may also be used to produce an increase of the enthalpy of the oxidizer while also cooling the plug nozzle.

Another object of the invention is to provide for thrust vector control alternatively to or in combination with other thrust vector control means by thrust elements mounted in the plug nozzle.

Still further objects and features of the invention will appear from the following description read with the accompanying drawings wherein.

Figure 1:
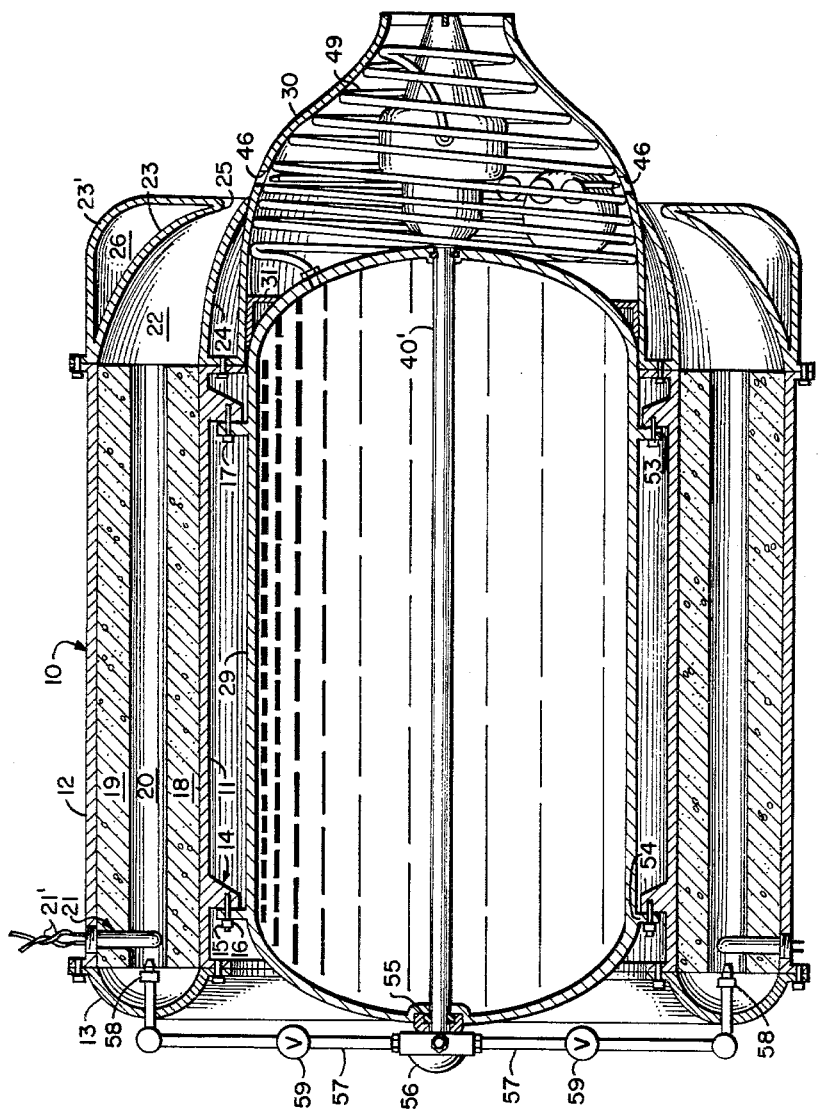
FIGURE 1 is a central longitudinal section through a hybrid rocket engine embodying the features of the present invention, the engine being shown in horizontal position with the nozzle coils not sectioned.

Referring now to FIGURE 1 of the drawings, the numeral 10 indicates generally an annular solid fuel chamber formed by inner and outer steel plates or shells 11 and 12 rolled into circular form, and the edge seams, not seen, secured together by welding or riveting.

The forward rims of the shells are flanged and connected to an annular head 13 by peripheral flanges thereof secured to the shell flanges in any suitable manner.

A peripheral series of connecting means 14 is mounted inside the forward end of the inner shell 11 and includes rearwardly projecting pins 15 threaded at their forward ends to receive nuts 16. A peripheral series of locating pins 17 are mounted inside the rearward end of the inner shell. The connecting means 14 and locating pins 17 interfit with parts on a centrally arranged tank for liquid oxidizer as later described.

Solid fuel grains 18 and 19 cast as thick walled cylinders are fitted to be against the inner and outer shells 11 and 12, respectively, leaving a combustion space 20 between the grains. The grains may be inserted into the space 20 from the forward end before the head 13 is attached. A series of electrical igniter devices 21 extend through the shell 12 and grain 19 into the combustion space 20. Leads 21' from each igniter 21 may be led forwardly of the engine to suitable electric controls (not shown). The burning gas from the grains is delivered into a conical collection chamber 22 arranged peripherally at the open end of the solid fuel chamber 10. The collection chamber is formed of an outer inwardly sloped wall 23 secured by any suitable means to a rear flange or outer shell 12, and an inner wall 24 secured to a rear flange of inner shell 11 and deflected inwardly at its rearward portion to form with inwardly sloped wall 23 an annular discharge orifice 25. Wall 23 has a portion 23' bent back toward the shell 12 and is secured thereto to provide a chamber 26 for containing a coolant, such as lithium, for cooling the collection chamber 22.

Figure 2:
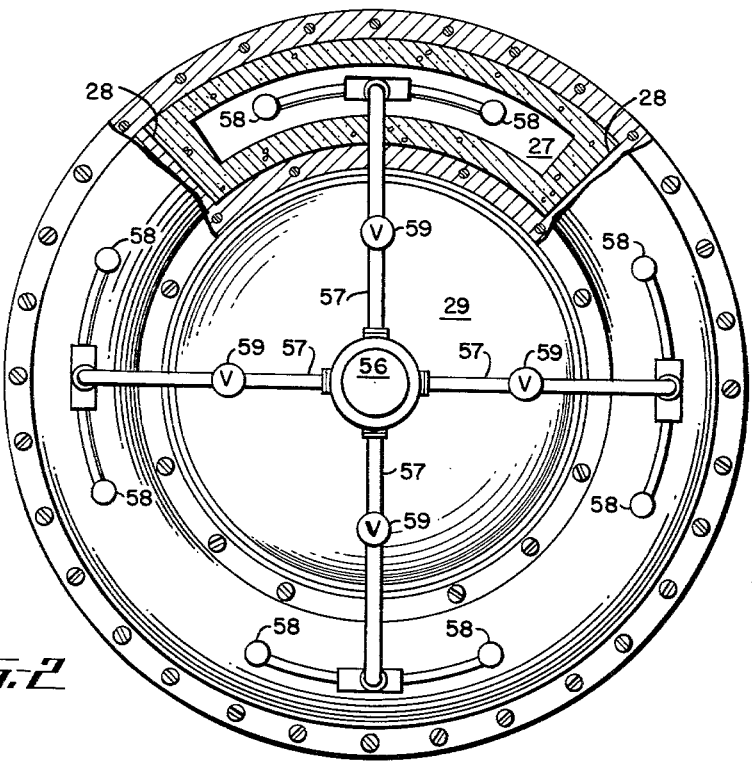
FIGURE 2 is an end elevation of the engine shown in FIGURE 1 looking in the direction of arrow 2 in that figure, but being partially broken away to show in transverse section a modified form of combustion chamber.
Figure 4:
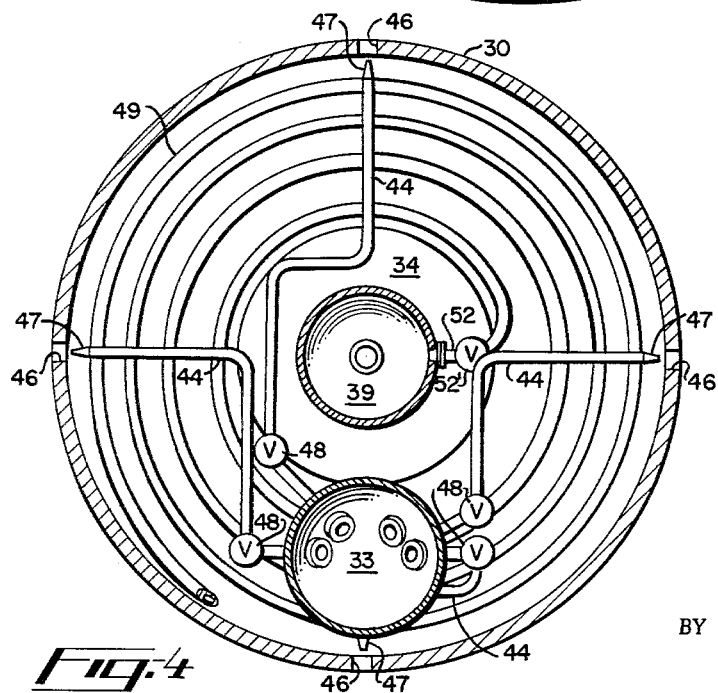
FIGURE 4 is a sectional view taken on line 4—4 in FIGURE 3.

If required, the inner and outer walls of the combustion chamber 10 may be positively spaced by dividing the annular combustion chamber into longitudinal segmental channels 27 by walls 28 as indicated in FIGURE 2, in which case the annular combustion chamber has ample rigidity to support the conical collection chamber 22. This arrangement provides one means for obtaining thrust vector control, that is, by circumferentially varying the liquid oxidizer flow rate to the channels 27 in a discrete and controllable manner.

Figure 3:
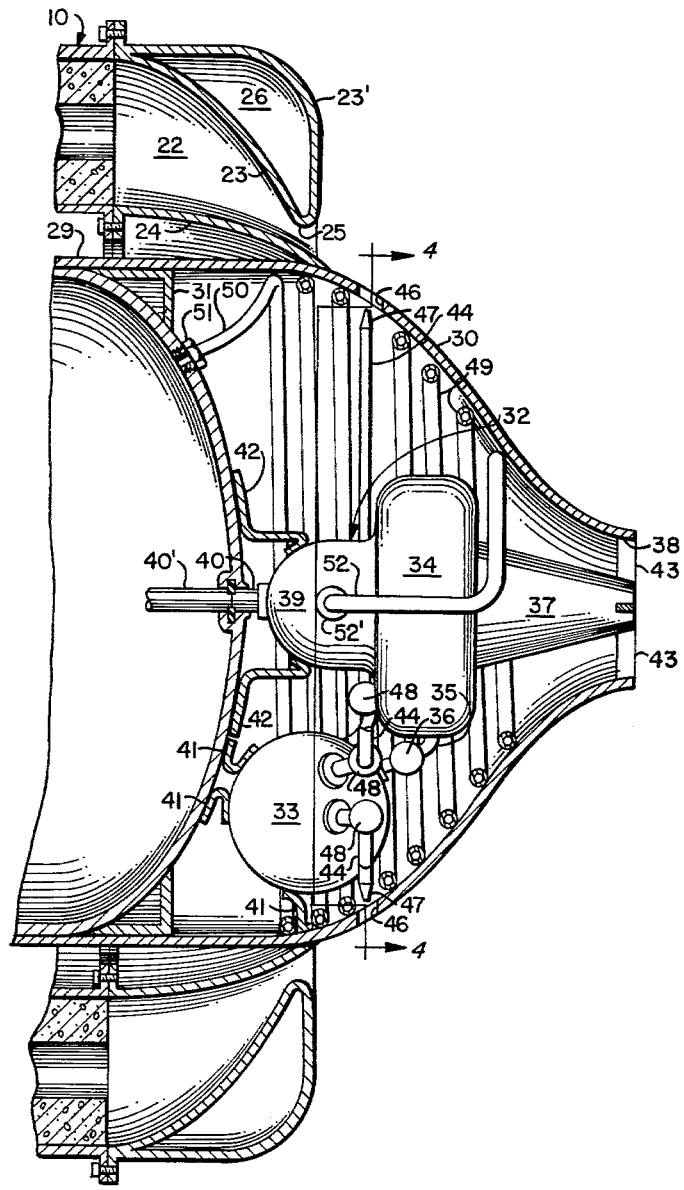
FIGURE 3 is an enlarged fragmentary partial longitudinal section of the rocket engine showing the plug nozzle and the parts positioned therein.

Liquid oxidizer is carried in a central tank 29 which is fitted at its after end with a plug nozzle 30 which may be removably mounted on a peripheral mounting angle iron 31 welded to the after wall of the tank 29. A nitrogen storage tank, not shown, may be connected to the tank 29 to pressurize the oxidizer therein. As best seen in FIGURE 3, a pump means of any suitable type is provided for supplying oxidizer from tank 29 to the solid fuel chamber 10. This means may be a gas-generator driven pump and turbine assembly which comprises a vessel 33 containing a gas, such as air under high pressure, the vessel 33 being connected to a turbine 34 through a conduit 35. An automatically operated one way valve 36 may be provided in the conduit 35 for controlling the flow of gas to the turbine and therefore the speed of the turbine. Turbine exhaust gases are expelled through a nozzle 37 which is in communication with an opening 38 in the rear of plug nozzle 30. The turbine shaft (not shown) is connected to a pump 39 which has an outlet 40 is communication with a supply pipe 40' leading through the tank 29 to the forward end of the rocket engine. The vessel 33 and pump and turbine assembly are secured to the tank 29 and plug nozzle 30 by suitable brackets 41 and 42, respectively, while the end of nozzle 37 is supported from the plug nozzle 30 by radially extending arms 43.

If it is required to provide means for thrust vector control mounted at the after end of the rocket, the vessel 33 containing any gas or air under high pressure may be connected to a series of pipes 44 leading to openings 46 in the plug nozzle 30, four of such openings and pipes being illustrated but it should be understood that any number could be utilized. Each pipe has an injection nozzle 47 arranged so that pressurized gas ejected therefrom will spray through the openings 46 into the path of gases exhausting from the discharge orifice 25, thereby providing a thrust vector control. Preferably, electrically operated valves 48 are provided in the pipes 44 for selectively controlling the injection of gas from each individual injection nozzle 47. The valves 48 may be operated by signals given for instance by inertial guidance or radio signals, as well understood in the art, or by controls, not shown, mounted on the rocket.

A heat interchange coil 49 is preferably provided to cool the throat section of the plug nozzle 30 and raise the temperature of the liquid oxidizer fed from tank 29 to the propellant containing chamber 10. The inlet end 50 of the coil 49 is detachably connected to a connection 51 communicating with the interior of tank 29, while the outlet end 52 of the coil is detachably connected to the pump 39 and passes through a suitable valve 52'.

It will be evident that by releasing the plug nozzle 30 from the tank 29 and demounting the coil 49, all units at the exterior of the after end of the tank are exposed for maintenance or adjustment.

The wall of tank 29 is furnished with a plurality of circumferentially arranged bored brackets 53 and 54. After-brackets 53 receive pins 17, while forward-brackets 54 are formed to receive threaded pins 15. Tightening up of nuts 16 threaded onto pins 15 clamps the tank 29 and combustion chamber 10 securely together.

Oxidizer supply pipe 40' extends through the forward end wall of tank 29 through packing gland 55 and is connected to a distributor head 56 from which branch pipes 57 lead the liquid oxidizer under pressure to the propellant chamber 10 for injection therein through spray heads 58. Where selective firing of a segmental combustion chamber 27 (FIG. 2) is desired to obtain thrust vector control, the branch pipes 57 are provided with individual electrically operated valves 59.

It is pointed out that the above description has referred to a rocket engine provided with electrically fired solid fuel grains, but the described engine may be used for engines utilizing hypergolic propellant, which may be chemically ignited propellant of solid grain and liquid oxidizer; in this case no provision has to be made for igniter devices, and the rocket engine can be stopped and restarted in flight. A suitable hypergolic propellant is lithium hydride fuel plus chlorine trifluoride oxidizer.

The electrical controlling devices for the various valves and igniters have not been shown or specifically referred to, and some of the details of mounting structure for the parts positioned in the plug nozzle have been omitted, since these are matters of common knowledge in the art.

Preferred embodiments of the invention have been described and shown herein by way of illustration but not as limitative of the invention, since various modifications may be made in the described embodiment by those skilled in the art without departing from the scope of the invention as set forth in the appended claims.

I claim:

1. A rocket engine comprising: chambers containing propellant and oxidizer nested one within the other, means for introducing oxidizer from said oxidizer chamber into the forward end of said propellant chamber by gaseous pressure and for effecting combustion of the propellant therein, a collection chamber into which the products of combustion from said propellant chamber are discharged, said collection chamber being provided with an annular discharge orifice, a plug nozzle against the outer surface of which the discharge from said annular dicharge orifice is directed, and means for generating gases under pressure to operate said means for introducing oxidizer into the forward end of the propellant chamber, said gas pressure generating means being positioned within said plug nozzle.

2. A rocket engine as set forth in claim 1 in which said propellant chamber is an annular chamber, said collection chamber closing the after end of said propellant chamber, and said oxidizer chamber comprising a tank positioned within the central opening of said annular propellant chamber.

3. A rocket engine as set forth in claim 1 and in which said propellant and oxidizer are of hypergolically reacting chemicals.

4. A rocket engine as set forth in claim 1 and in addition comprising cooling means for said plug nozzle through which oxidizer drawn from said oxidizer chamber is circulated, said means for introducing oxidizer into the forward end of the propellant chamber including pump means effective to draw oxidizer from said oxidizer chamber through said plug nozzle cooling means and deliver the oxidizer from said plug nozzle cooling means to said propellant chamber at the forward end thereof.

5. A rocket engine comprising: chambers containing propellant and oxidizer nested one within the other, said propellant chamber comprising an annular chamber divided into a plurality of longitudinally extending arcuate segments, said oxidizer chamber comprising a tank positioned within the central opening of said annular propellant chamber, means for introducing oxidizer from said oxidizer tank selectively into said segments of said annular propellant chamber by gaseous pressure and for effecting combustion of the propellant therein, the selective introduction of oxidizer into said segments of said annular propellant chamber providing thrust vector control, a collection chamber into which the products of combustion from said annular propellant chamber are discharged, said collection chamber closing the after end of said annular propellant chamber and being provided with an annular discharge orifice, a plug nozzle against the outer surface of which the disharge from said annular discharge orifice is directed, and means for generating gases under pressure to operate said means for introducing oxidizer selectively into said segments of said annular propellant chamber, said gas pressure generating means being positioned within said plug nozzle.

6. A rocket engine comprising: chambers containing propellant and oxidizer nested one within the other, said propellant chamber comprising an annular chamber, said oxidizer chamber comprising a tank positioned within the central opening of said annular propellant chamber, means releasably securing said annular propellant chamber and said oxidizer tank together to enable the oxidizer tank to be reused, means for introducing oxidizer from said oxidizer tank into said annular propellant chamber by gaseous pressure and for effecting combustion of the propellant therein, a collection chamber into which the products of combustion from said annular propellant chamber are discharged, said collection chamber closing the after end of said annular propellant chamber and being provided with an annular discharge orifice, a plug nozzle against the outer surface of which the discharge from said annular discharge orifice is directed, and means for generating gases under pressure to operate said means for introducing oxidizer into said annular propellant chamber, said gas pressure generating means being positioned within said plug nozzle.

7. A rocket engine comprising: chambers containing propellant and oxidizer nested one within the other, said propellant chamber comprising an annular chamber, said oxidizer chamber comprising a tank positioned within the central opening of said annular propellant chamber, means for introducing oxidizer from said oxidizer tank into said annular propellant chamber by gaseous pressure and for effecting combustion of the propellant therein, a collection chamber into which the products of combustion from said annular propellant chamber are discharged, said collection chamber closing the after end of said annular propellant chamber and being provided with an annular discharge orifice, a plug nozzle against the outer surface of which the discharge from said annular discharge orifice is directed, means for generating gases under pressure to operate said means for introducing oxidizer into said annular propellant chamber, said gas pressure generating means being positioned within said plug nozzle, and thrust producing devices arranged within said plug nozzle and discharging radially of the longitudinal axis of the rocket enginge to provide thrust vector control.

References Cited by the Examiner
UNITED STATES PATENTS

| | | | |
|---|---|---|---|
| 2,491,610 | 12/49 | Goddard | 60—35.6 |
| 2,637,973 | 5/53 | Lawrence | 60—35.6 |
| 2,868,127 | 1/59 | Fox | 60—35.6 X |
| 2,984,973 | 5/61 | Stegelman | 60—35.6 |
| 3,017,748 | 1/62 | Burnside | 60—39.48 X |
| 3,094,072 | 6/63 | Parilla. | |
| 3,127,739 | 4/64 | Miller | 60—39.47 X |

MARK NEWMAN, *Primary Examiner.*

JULIUS E. WEST, SAMUEL LEVINE, *Examiners.*